(12) United States Patent
Cochran et al.

(10) Patent No.: US 7,240,106 B2
(45) Date of Patent: Jul. 3, 2007

(54) SYSTEM AND METHOD FOR REMOTE DISCOVERY AND CONFIGURATION OF A NETWORK DEVICE

(75) Inventors: Charles W. Cochran, Houston, TX (US); Billy S. Little, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 803 days.

(21) Appl. No.: 09/842,572

(22) Filed: Apr. 25, 2001

(65) Prior Publication Data

US 2002/0161867 A1 Oct. 31, 2002

(51) Int. Cl.
*G06F 15/177* (2006.01)
(52) U.S. Cl. ............. 709/222; 709/220; 709/224; 709/226; 710/8; 710/9; 710/10; 713/1; 713/100
(58) Field of Classification Search ........ 709/220–224; 710/8–10; 713/1, 100
See application file for complete search history.

(56) References Cited

U.S. PATENT DOCUMENTS

| | | | | |
|---|---|---|---|---|
| 6,012,088 | A * | 1/2000 | Li et al. ................. | 709/219 |
| 6,076,106 | A * | 6/2000 | Hamner et al. .......... | 709/223 |
| 6,229,540 | B1 * | 5/2001 | Tonelli et al. ........... | 345/735 |
| 6,286,038 | B1 * | 9/2001 | Reichmeyer et al. ..... | 709/220 |
| 6,336,138 | B1 * | 1/2002 | Caswell et al. .......... | 709/223 |
| 6,505,243 | B1 * | 1/2003 | Lortz .................... | 709/220 |
| 6,721,880 | B1 * | 4/2004 | Pike ...................... | 713/1 |
| 6,757,723 | B1 * | 6/2004 | O'Toole et al. .......... | 709/222 |
| 6,901,439 | B1 * | 5/2005 | Bonasia et al. .......... | 709/220 |
| 2002/0062364 | A1 * | 5/2002 | Watanabe ............... | 709/223 |

* cited by examiner

*Primary Examiner*—Kim Huynh
*Assistant Examiner*—Eron Sorrell

(57) ABSTRACT

A technique for remotely configuring a computing device via a network. A device configuration system is provided to determine a network address of the computing device, to identify the computing device, and to facilitate network configuration of the computing device. The device configuration system also may include a remote interface and a remote device information system.

97 Claims, 8 Drawing Sheets

SYSTEM AND METHOD FOR REMOTE DISCOVERY AND CONFIGURATION OF A NETWORK DEVICE

FIELD OF THE INVENTION

The present invention relates generally to the field of computer systems and, more specifically, to networking and configuration of computer systems. A technique is provided for discovering, identifying, and configuring network parameters for a computing device coupled to a network.

BACKGROUND OF THE INVENTION

This section is intended to introduce the reader to various aspects of art, which may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Computers, servers, and various other computing devices are typically configured locally by interacting with the computing device, inputting configuration parameters, and utilizing local hardware, software, and computing resources. The computing device may include a variety of circuitry, memory devices, processors, power sources, and other electronics for a particular application. In some computing devices, input/output devices are provided to facilitate user interaction. However, many computing devices are not configured for direct or local user interaction. For example, various network appliances, servers, and computing devices are "headless" devices, which means that the device lacks a display and input devices.

Although the computing device may not have input/output devices for user interaction, the computing device may still require initial setup and subsequent configuration when the computing device is coupled to a network, utilized for a particular application, or otherwise allocated such that software, hardware and operational parameters require setup or re-configuration. In particular, network devices often lack a display, a keyboard, and a pointing device. Servers, routers, and other computing devices are typically disposed in a network to manage and direct network traffic, to facilitate data transfer, and to enhance the operability of the network. For example, a network may include a cache server, an application server, a print server, a file server, a proxy server, a secure/firewall server, a staging server, a dedicated server, a web server, a domain name system ("DNS") server, a dynamic host configuration protocol ("DHCP") server, a network attached storage ("NAS") server, a virtual private network ("VPN") server, and various other servers, appliances, and computing devices. Each of these computing devices requires configuration to operate on the network, which may include a local area network ("LAN") or a plurality of LANs forming a wide area network ("WAN") such as the Internet. However, the lack of standard input/output devices complicates the configuration process.

Various manual procedures may be employed to configure these computing devices during initial setup and subsequent reconfiguration. For example, a device having a keypad and liquid crystal display ("LCD") may be coupled to the computing device temporarily to facilitate a manual setup of software, hardware, and operational parameters (e.g., network parameters). A console having a keyboard and a monitor also may be used to interact temporarily with the computing device. Alternatively, a self-executing program may be disposed on a storage media (e.g., a floppy disk or a compact disk) and inserted manually into a disk drive of the computing device to configure at least a portion of the computing device. For example, the self-executing program may install desired network parameters (e.g., an IP address, a subnet address, and a gateway address) for the computing device to facilitate network operability of the computing device. However, the network parameters may be unknown and the computing device may not have a disk drive. Accordingly, the configuration process requires a cable connection to an interactive computing device having input/output devices to facilitate setup. Normally, such a cable connection facilitates interaction with the computing device via a line-by-line programming language, such as LINUX.

The cable connection is typically a temporary cable connection, because the identity of the computing device would be unknown on a network. In a network, a dynamic host configuration protocol ("DHCP") server may be provided to assign a dynamic IP address to a device requesting an IP address, yet the identity of the device obtaining the dynamic IP address is unknown. With dynamic addressing, a device can have a different IP address every time it connects to the network. In some systems, the device's IP address can even change while it is still connected. DHCP also supports a mix of static and dynamic IP addresses. Although the IP addresses assigned by the DHCP server may be determinable, the actual devices corresponding to those IP addresses are not determinable by conventional techniques.

A typical solution is to enter a static IP address manually, rather than utilizing a dynamically assigned IP address. By manually entering the static IP address, the computing device can be identified and configured via the network. However, a static IP address may be undesirable, and manual configuration in this manner requires time and a level of skill beyond a typical consumer. The consumer would need to configure both the network server and the computing device according to the static IP address.

Another solution is to employ a reverse address resolution protocol ("RARP") communication to determine the IP address of the computing device. Each of the computing devices on a network have a unique hardware address, or medium access control ("MAC") address, which is assigned by the manufacturer of the network interface card ("NIC"). The MAC address typically includes a hardware identification number and a manufacturer/source identification number. The RARP process reads the local MAC address of the NIC and transmits a RARP communication onto the network requesting a RARP reply with the computing device's IP address. A RARP server then returns a RARP reply with the desired IP address. While the RARP process facilitates determination of the computing device's IP address, the RARP process is system dependent and it utilizes a command line interface. Accordingly, RARP is not uniformly applicable, and it may require a significant about time and a level of skill beyond the typical consumer.

A considerable amount of user input and manual interaction is also required to configure hardware, software, and other operational parameters for conventional computer systems, such as desktop and laptop computers. A conventional computer system may include a motherboard, a processor, RAM, a hard drive, a disk drive, a modem, a network card, a video card, an audio card, a power supply, and various other electronics and computing resources. Conventional computer systems also may include various peripheral devices, such as a display, a keyboard, a mouse, and various other input/output devices for interacting with the computing resources of the computer system. The operating system, device drivers, and specific software applications are typically loaded directly onto the computer system via a floppy disk, a compact disk, or other storage media. The user configures the computer system by selecting desired features, entering appropriate parameters, and manually progressing through the software as user input is required.

In all categories of computing devices, service and maintenance are generally provided via e-mail, telephone, brochures and other informational books, and electronic pages viewable on the Internet. The user must seek information or assistance and then manually configure the computing device based on the information obtained for the particular issue or problem. Unfortunately, the typical consumer is relatively unskilled and unknowledgeable in areas of hardware, software, networks, and other operational configurations of computing devices.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

According to one aspect of the present technique, a technique is provided for remotely configuring a computing device via a network. A device configuration system is provided to determine a network address of the computing device, to identify the computing device, and to facilitate network configuration of the computing device. The device configuration system also may include a remote interface and a remote device information system.

Another aspect of the present technique provides a method for configuring a computing device coupled to a network. The method includes electronically locating a computing device coupled to a network, identifying the computing device, and configuring network parameters of the computing device based on the identification.

Yet another aspect of the present technique provides a method for networking a desired device. The method includes electronically locating a desired device on a network, and remotely configuring operational parameters of the desired device via the network.

A further aspect of the present technique provides a system of configuring a second computing device via a first computing device, wherein the first and second computing devices are communicatively coupled via a network. The system includes a device configuration assembly accessible by the first computing device. The device configuration assembly includes a device discovery assembly adapted for discovering the second computing device on the network, and a device setup assembly adapted for initiating configuration of the second computing device via the network.

A still further aspect of the present technique provides a system for remotely configuring a networked computing device. The system includes a network analysis module adapted to determine a network address of a desired device coupled to a network. A device identification module is also provided for identifying the desired device based on desired parameters. The system also includes a device configuration module adapted to configure the desired device via the network.

BRIEF DESCRIPTION OF THE DRAWINGS

Exemplary embodiments will hereafter be described with reference to the accompanying drawings, wherein like reference numerals denote like elements, and.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In view of the problems discussed above, a technique is needed for configuring "headless" devices to accommodate the lack of input/output devices. A technique is also needed for remotely locating and identifying a networked computing device. There is also a need for a remote device configuration system, such as a routine for configuring a computing device based on a particular type of device, a particular application, a particular network environment, and other unique features. It would be particularly useful to facilitate remote identification and configuration of computing devices, such as network devices, which require operational parameters (e.g., network address settings) not easily determinable by a typical consumer. A technique is also needed for remotely interacting with and configuring operational settings for a computing device, such as a conventional computer system, to facilitate optimal operation, servicing, and maintenance of the computing device. There is also a particular need for both electronically and physically identifying a networked device.

In addition, a technique is needed for automatically identifying a particular device in a network. A technique is also needed for automatically obtaining specifications for a remote device. There is also a particular need for automatically identifying and assigning a network address to a networked device. Also, a need exists for an integral system for identifying and characterizing a remote device, and for assigning a network address to the remote device.

Furthermore, a client system uses DHCP to relieve the user of the need to know how to set up the network and of the need to know the specific network parameters assigned to their system. The technique disclosed herein provides this type of functionality for a server system. The server can be discovered to facilitate communication from the client system, while relieving the user of the need to know the specific address of the server and of the need to configure the network parameters manually in order to access the network.

Figure 1:
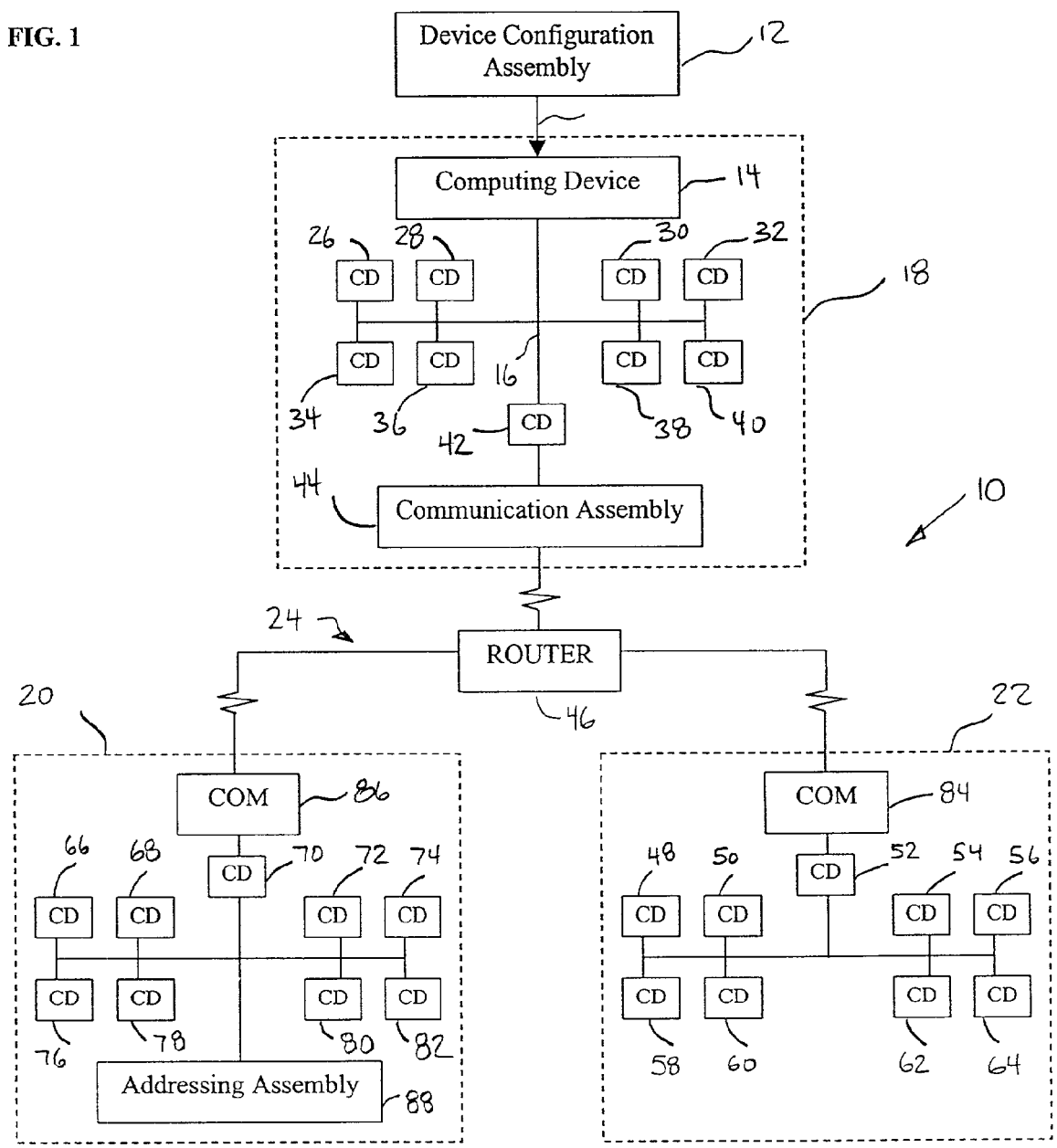
FIG. 1 illustrates a network diagram illustrating an exemplary device configuration system of the present technique, wherein a device configuration assembly is accessible by a computing device coupled to a network.

Turning now to the drawings and referring initially to FIG. 1, the present technique provides a device configuration system 10 to facilitate configuration of computing devices, such as headless servers, network appliances and other computers, which may be coupled to a network. The device configuration system minimizes user intervention during the configuration process by automating many of the configuration procedures, which are typically performed manually and independently during a particular device configuration. The device configuration system also facilitates remote identification and configuration of computing devices, which may include both headless and conventional computing devices having input/output devices.

The device configuration system 10 illustrated in FIG. 1 includes a device configuration assembly 12 accessible by a computing device 14, which is coupled to a network 16. The device configuration assembly 12 may be a device configuration program, which is disposed on a memory device or media (e.g., a disk), or it may comprise one or more remote devices or programs communicatively coupled to the computing device 14. The computing device 14 includes various computing resources, such as a processor, circuitry, and memory, and also may include various input/out devices to facilitate user interaction with the computing device 14. The network 16 may form a local area network ("LAN"), such as LAN 18, which is communicatively coupled to a plurality of other LANs to form a wide area network ("WAN"), such as the Internet. For example, the LAN 18 may be communicatively coupled to LANs 20 and 22 to form a WAN 24. The LAN 18 may include a plurality of computing devices, such as computing devices 26, 28, 30, 32, 34, 36, 38, 40 and 42, which are communicatively coupled via the network 16. The computing devices 26–42 may include a computer system, an output device (e.g., a printer, a display, etc.), an input device (e.g., a scanner), a server, a network appliance, and/or various other systems and devices. The LAN 18 also may have a communication assembly, such as communication assembly 44, to facilitate communication with external LANs and WANs. The communication assembly 44 may include a modem, a DSL line, a firewall, a network server, a cache server, a router, and/or various other devices to facilitate communication with external networks. As illustrated, the LAN 18 is communicatively coupled to the LANs 20 and 22 via a router 46, which may include various hardware and software to facilitate data transfer and routing through the WAN 24.

As discussed above, many computing devices lack a video display, a keyboard, and a pointing device, thereby complicating or preventing local configuration of the computing device. If the network address (e.g., IP address, subnet address, gateway address) is known for the particular computing device, then it may be configured over the network. However, addressing assemblies (e.g. DHCP servers) generally do not identify the particular computing device corresponding to the IP address to network clients.

In the LAN 18 illustrated in FIG. 1, the device configuration system 10 utilizes the device configuration assembly 12 to configure one or more of the computing devices 26–42. If one of the computing devices 26–42 is an addressing system (e.g., computing device 42), such as a DHCP server, then the device configuration system 10 utilizes the addressing system to provide a list of network addresses for the computing devices 26–42 communicatively coupled via the network 16. The device configuration assembly 12 then identifies the particular computing device corresponding to the network addresses. This may be done by monitoring address assignments and requests, intercepting network communications, transmitting network signals to the network addresses, and scanning the network for unique identifiers for the computing devices 26–42. For example, the computing devices 26–42 may be identified according to the MAC addresses of the network interface cards or various other hardware and software uniquely identifying a source, class, type or model of the computing devices 26–42. Accordingly, the addressing system may include a variety of local and remote hardware, circuitry, servers, software and routines to facilitate address monitoring and management, network analysis, and other functions necessary to identify the computing devices 26–42.

If the LAN 18 does not have a local addressing system, then the device configuration system 10 utilizes the device configuration assembly 12 to manage network addressing for the network 16. The device configuration assembly 12 may include a variety of circuitry and software for detecting and responding to address requests from the computing devices 26–42, thereby acting as an addressing system as required for configuration of the computing devices 26–42. For example, the device configuration assembly 12 may include an address request detection routine, an address request analysis routine, a response routine, an address assignment routine, and a response transmission routine for transmitting a network address to the computing device. The device configuration assembly 12 can also limit its network management to desired devices, such as a particular manufacturer, a particular class of devices, a particular TCP/IP port, or other unique identification criteria. If the device configuration assembly 12 is configured to facilitate configuration of only a particular group of desired devices, then the device configuration assembly 12 may limit its response routine to that particular group.

Once the device configuration assembly 12 has identified the computing devices 26–42 corresponding to the network addresses, then the device configuration assembly 12 may initiate configuration of the desired computing devices. For example, the device configuration assembly 12 may determine and transmit a remote network address to the desired computing devices which then utilize the remote network address to access appropriate configuration parameters for the desired computing devices based on the identified characteristics of the desired computing devices. The remote network address may include an Internet address to an interactive or automatic device configuration routine, which may be initiated upon access to the remote network address.

The device configuration system 10 can also be utilized across a WAN, such as the WAN 24 or the Internet. For example, the device configuration assembly 12 may be utilized by the computing device 14 to facilitate the configuration of remote devices, such as remote computing devices 48, 50, 52, 54, 56, 58, 60, 62 and 64 of the LAN 22 and remote computing devices 66, 68, 70, 72, 74, 76, 78, 80 and 82 of the LAN 20. The computing device 14 can communicate with the remote computing devices 48–64 and 66–82 via the communication assembly 44, the router 46 for the WAN 24, and the communication assemblies 84 and 86 for the LANs 22 and 20, respectively. Although the LAN 22 lacks an addressing assembly, the LAN 20 includes an addressing assembly 88 for managing network address assignment of the remote computing devices 66–82. As discussed above, the device configuration assembly 12 may be utilized in a network including or lacking an addressing assembly.

In the LAN 22, the device configuration assembly 12 is utilized by the computing device 14 to detect address requests and to assign a network address (e.g., an IP address) to the desired computing devices in the LAN 22. Accordingly, the operation of the device configuration assembly 12 as an addressing system facilitates the discovery and identification of the desired computing devices. In the LAN 20, the device configuration assembly 12 is utilized by the computing device 14 to obtain network address assignments (e.g., IP addresses) from the addressing assembly 88 and to identify the remote computing devices corresponding to those network addresses. The device configuration assembly 12 also may be utilized by the computing device 14 to monitor network communications, address requests, address assignments, and other criteria of the remote computing devices 48–64 and 66–82 to facilitate device identification and configuration in the remote networks (e.g., LANs 22 and 20). The device configuration assembly 12 also may be utilized to search the LANs 20 and 22 for unique identification characteristics of the remote computing devices 66–82 and 48–64. Once the desired devices are identified in the LANs 20 and 22, the computing device 14 may utilize the device configuration assembly 12 to initiate configuration of the desired devices. Although the remote computing devices 66–82 and 48–64 are not local to the device configuration assembly 12, the device configuration system 10 is configured to facilitate identification and configuration of computing devices throughout various LANs and WANs.

Figure 2:
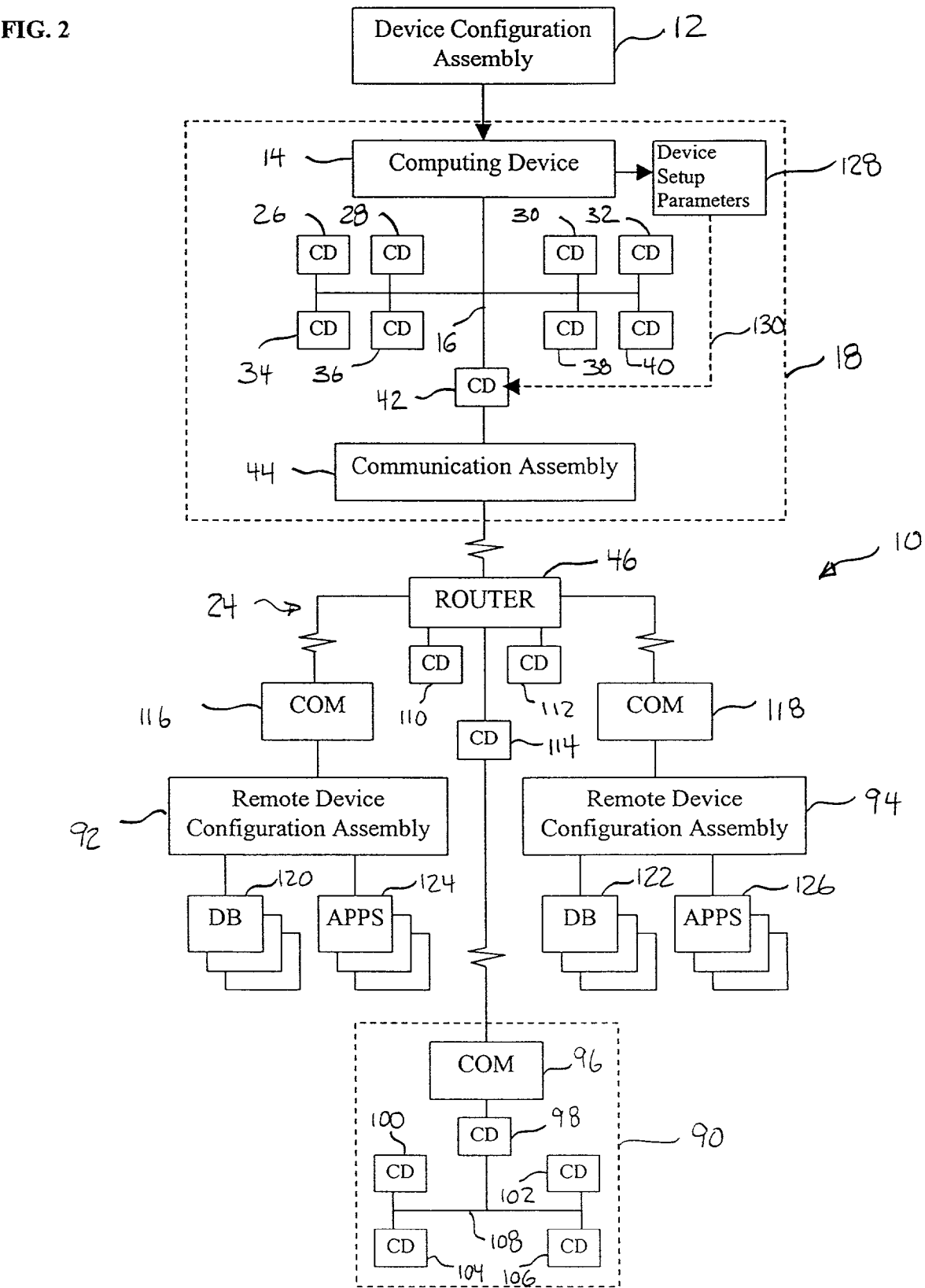
FIG. 2 illustrates a network diagram illustrating the device configuration system having remote device configuration assemblies.

As discussed above, the device configuration system 10 may include a variety of computing devices, communication assemblies, and various local and wide area networks. FIG. 2 is a block diagram of the device configuration system 10 having the LAN 18 communicatively coupled to the WAN 24, which is communicatively coupled to LAN 90 and remote device configuration assemblies 92 and 94. As illustrated, the LAN 90 includes a communication assembly 96 and a plurality of computing devices, such as computing devices 98, 100, 102, 104, and 106, which are communicatively coupled via a network 108. The computing devices 98 through 106 may comprise a variety of computer systems, servers, network devices and appliances, and various other electronics and computing components. The communication assembly 96 may comprise a firewall, a server, and various other communications hardware and software to facilitate communication within the LAN 90 and the WAN 24. The WAN 24 also may include a variety of other computing components, such as computing components 110, 112 and 114, which are communicatively coupled to the WAN 24 in various locations. For example, the computing devices 110 and 112 are communicatively coupled to the router 46, while the computing device 114 is communicatively coupled to the WAN 24 between the router 46 and the LAN 90. The computing devices 110, 112 and 114 may include various network appliances, such as a cache server and a DNS server, to facilitate data transfer and routing throughout the WAN 24. The remote device configuration assemblies 92 and 94 are communicatively coupled to the router 46 via communication assemblies 116 and 118, respectively. As discussed above, the device configuration system 10, which may include both the device configuration assembly 12 and the remote device configuration assemblies 92 and 94, may include a variety of circuitry, software, computing hardware, and various local and remote systems and assemblies to facilitate the identification and configuration of computing devices remote from the computing device 14. Moreover, the device configuration assembly 12 may operate independently from any computing device, such as the computing device 14, to automatically monitor, identify, and configure new computing devices coupled to a local or remote network. Accordingly, the device configuration system 10 may utilize both local and remote computing resources to identify and configure computing devices throughout a variety of local and remote networks.

Once the device configuration assembly 12 has been utilized to discover and identify the desired computing device, the device configuration system 10 may interact with or initiate one or more of the remote device configuration assemblies 92 and 94. For example, the device configuration assembly 12 may generate a remote network address corresponding to one of the remote device configuration assemblies 92 and 94, which may have device-specific and general configuration information and applications. The remote network access can be utilized by the desired computing device to access device information and to complete the device configuration process. For example, the computing device 14 may initiate the device configuration assembly 12 to identify the desired device, generate the appropriate remote network address, transmit the remote network address to the desired device, and initiate communication between the desired device and the remote device configuration assembly corresponding to the remote network address. Accordingly, the remote device configuration assembly 92 or 94 may then be utilized to access device information and necessary software to configure the desired device for operation on the network. For example, the remote device configuration assemblies 92 and 94 may include a plurality of databases, such as databases 120 and 122, and a plurality of software applications, such as applications 124 and 126, respectively. The databases 120 and 122 may include device specifications, network parameters, and various other operational parameters to configure hardware, software (e.g., operating system), network parameters (e.g., IP Address, DNS server, Gateway, Subnet, etc., and desired features of the device. The remote device configurations 92 and 94 may service distinct device classes, distinct organizations, or various other classes or groups for the computing devices. Thus, the device configuration system 10 also may integrate a plurality of remote device configuration assemblies for various device types, classes, manufacturer sources, and other groups. Device configuration system 10 also may include routines for configurating and installing new software, software updates, firmware updates, and for executing various routines via one or more of the remote device configuration assemblies 92 and 94.

Once the device configuration assembly 12 has been utilized to identify the desired computing device and initiate communication between the desired device and the remote device configuration assembly (e.g. remote device configuration assemblies 92 and 94), the desired device is configured either automatically by, or interactively with, the remote device configuration assembly. For example, the device configuration assembly 12 may initiate an interactive device configuration process between the remote device configuration assemblies 92 or 94 and the desired computing device. Once the interactive configuration process has been initiated, the remote device configuration assembly 92 or 94 may transmit web pages to the user via the computing device 14, where the user can interactively select desired features, input information, and perform various other operations to facilitate the configuration of the desired device. Accordingly, the device configuration system 10 facilitates automatic and interactive device configuration of the desired device via the computing device 14, the device configuration assembly 12, and one or more of the remote device configuration assemblies 92 and 94. This is particularly useful where the desired device is a headless or a diskless device, or where the configuration process is more efficiently performed remotely from the desired device. For example, the device configuration system 10 is particularly useful for a software or hardware manufacturer to service, upgrade, maintain, and configure products sold or licensed to the user.

After automatic or interactive device configuration via the remote device configuration assembly 92 or 94, the device configuration system 10 generates device setup parameters 128 for the desired device, such as the computing device 42. As illustrated in FIG. 2, the device setup parameters 128 may be received by the computing device 14 and then transmitted to the computing device 42. Although the remote device configuration assembly may transmit the device setup parameters 128 directly to the desired device, such as the computing device 42, the remote device configuration assembly 92 or 94 may transmit information to the computing device 14 for subsequent transmittal to the computing device 42. The information received by the device configuration assembly 12 may require further processing or analysis, or it may comprise the final device setup parameters 128 generated for direct or indirect transmittal to the desired computing device. For example, the device setup parameters may be electronically transferred to the computing device 42, via the network 16, or the device setup parameters 28 may be disposed on a storage media (e.g., a disk) for subsequent manual transmission to the computing device 42. It should also be noted that the device configuration system 10 may include an identification system for physically locating the desired computing device. For example, the device configuration assembly 12 and the desired device may have signal assemblies, which may be used to transmit an identification signal to identify the physical location of the desired computing device in the network. Accordingly, the device configuration system 10 facilitates the remote discovery, identification, and configuration of the desired computing device on local and remote networks.

Figure 3:
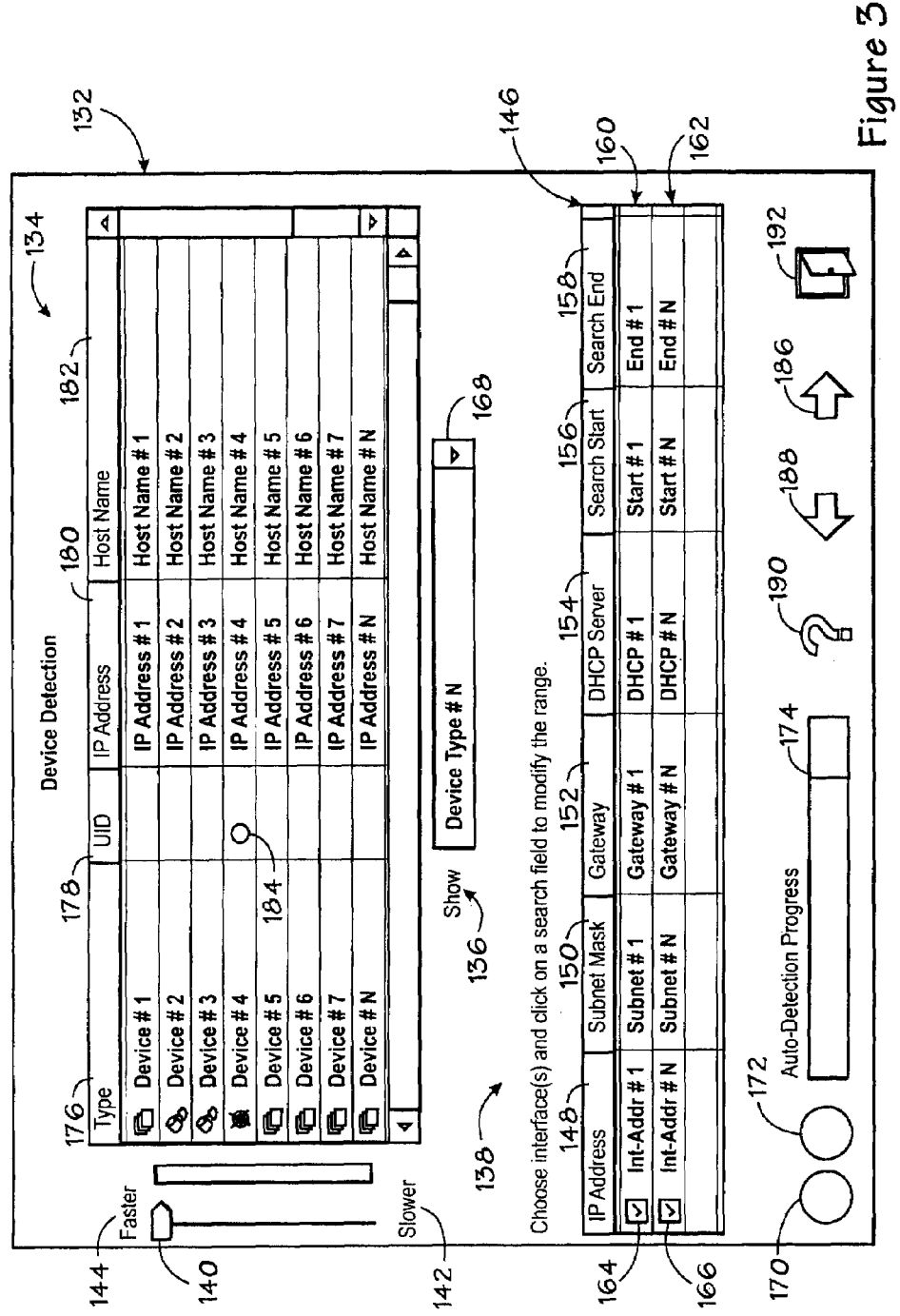
FIG. 3 illustrates an exemplary user interface for the device configuration system.

As discussed above, the device configuration assembly 12 may include hardware and software, such as a device configuration program disposed on a memory device, which may be accessed and executed by the computing device 14 to identify and configure the desired device. FIG. 3 illustrates an exemplary user interface for the device configuration assembly 12. As illustrated, in this embodiment, the user interface 132 includes a device list 134, a device type option 136, an address search option 138, and a slider bar 140 for adjusting the search speed between a slower speed 142 and a faster speed 144. In operation, the device configuration assembly 12 may automatically detect communication interfaces (e.g., network cards) disposed in the computing device 14. The communication interfaces detected by the device configuration assembly 12 may be displayed to the user via the user interface 132, which may allow the user to select the desired communication interfaces from the address search option 138. As illustrated, the address search option 138 also provides a variety of network information for the detected communication interfaces via a table 146.

The table 146 includes an IP address column 148, a subnet mask column 150, a gateway column 152, a DHCP server column 154, a search start column 156, and a search end column 158. The network information in the table 146 may be detected by the device configuration assembly 12, which then displays the information to the user for viewing and modification. The network information is provided for each of the detected communication interfaces, such as interfaces listed in rows 160 and 162. The communication interfaces discovered and listed in rows 160 and 162 have interface addresses, such as INT-ADDR#1 and #N, which may be selected via check boxes 164 and 166 for device scanning with the device configuration assembly 12. The table 146 also lists subnets #1 and #N, gateways #N, DHCPs#1 and #N, start #1 and #N, and end #1 and #N, which correspond to the subnet mask column 150, the gateway column 152, the DHCP server column 154, the search start column 156, and the search end column 158. The user may accept the detected network information for the network interfaces, or the user can modify one or more of the network information parameters listed in the table 146. Accordingly, in this embodiment, the user has control over the specific network interface and search range used by the device configuration assembly 12 to locate the desired device.

The user interface 132 facilitates user input and monitoring of the device detection process which is executed by the device configuration assembly 12. The address search option 138 facilitates selection and modification of the network interface and the address search ranges. The device type option 136 includes a device type option menu 168, which allows the user to select one or more device types, such as a device type #N, for device detection by the device configuration assembly 12. The user can also modify the search speed for the device detection procedure via the slider bar 140. However, a speed selected via the slider bar 140 also may affect the overall quality of the search. For example, the faster search 144 may not search the network in as much detail as the slower search 142. Nevertheless, the user may be provided a broad range of control over the device detection procedure by the device configuration assembly 12.

As illustrated, the user interface 132 also has a start button 170, a stop button 172, and a progress indicatator 174. In operation, the device configuration assembly 12 may be initiated automatically upon access by the computing device 14. However, the device configuration assembly 12 allows the user to stop the device detection procedure by pressing the stop button 172. The user interface 132 also allows the user to run the device detection procedure at any time by pressing the start button 170. As the device detection procedure executes, the device list 134 is filled with devices detected by the device configuration assembly 12. For example, the device configuration assembly 12 may detect devices #1, #2, #3, #4, #5, #6, #7 and #N and list those discovered devices in a type column 176. For each of the devices #1 through #N, the device configuration assembly 12 also may detect an identification signal, a network address for the device, and a host name for the device. For example, the device list 134 may include a UID column 178, an IP address column 180, and a host name column 182. For the devices #1–#N, the device configuration assembly 12 may detect and display IP addresses #1–#N and host names #1–#N in the IP address column 180 and the host name column 182, respectively. Accordingly, the device configuration assembly 12 communicates the detected devices to the user via the device list 134.

Also, the UID column 178, which corresponds to a unit identification signal, may be utilized to communicate a signal with one of the devices listed in the type column 176 to physically identify the desired device. For example, the user may click on one of the devices #1–#N to trigger and identification signal to be transmitted to the desired device, where the signal may trigger an identification signal on the desired device to facilitate physical location of the desired device in a network. Alternatively, the user may press a button or trigger a signal event on the desired device itself to transmit a signal to the user interface 132, where a device identification signal may appear to the user. For example, an identifier 184 is illustrated in the device list 134 for the device #4.

Once the device detection procedure is completed by the device configuration assembly 12, the device configuration system 10 may automatically configure the desired device or devices, or it may require further user interaction via the user interface 132. For example, the user interface 132 may proceed to a device configuration screen for configuring the desired devices listed in the device list 134. The configuration process may be triggered automatically by the device configuration assembly 12, or it may require the user to actuate a button to proceed. In this example, the user interface 132 also includes a forward button 186 and a reverse button 188 for browsing through configuration screens. The user interface 132 can also have a help button 190 and an exit button 192 for obtaining configuration assistance or for exiting the interface 132, respectively. Moreover, if the device configuration assembly 12 does not detect any devices on the network, then the user may proceed to configure the device by clicking on the forward button 186, which triggers a manual configuration routine to interact with the user, obtain information, and manually configure the desired device. The manual configuration routine may be used even if the device configuration assembly 12 does not automatically detect desired devices on the network. Accordingly, the device configuration assembly 12 may initiate user interaction via the user interface 132, ensure proper identification of the desired device 92 or 94, and then direct the desired device to the appropriate remote configuration assembly for completion of the device configuration process.

Figure 4:
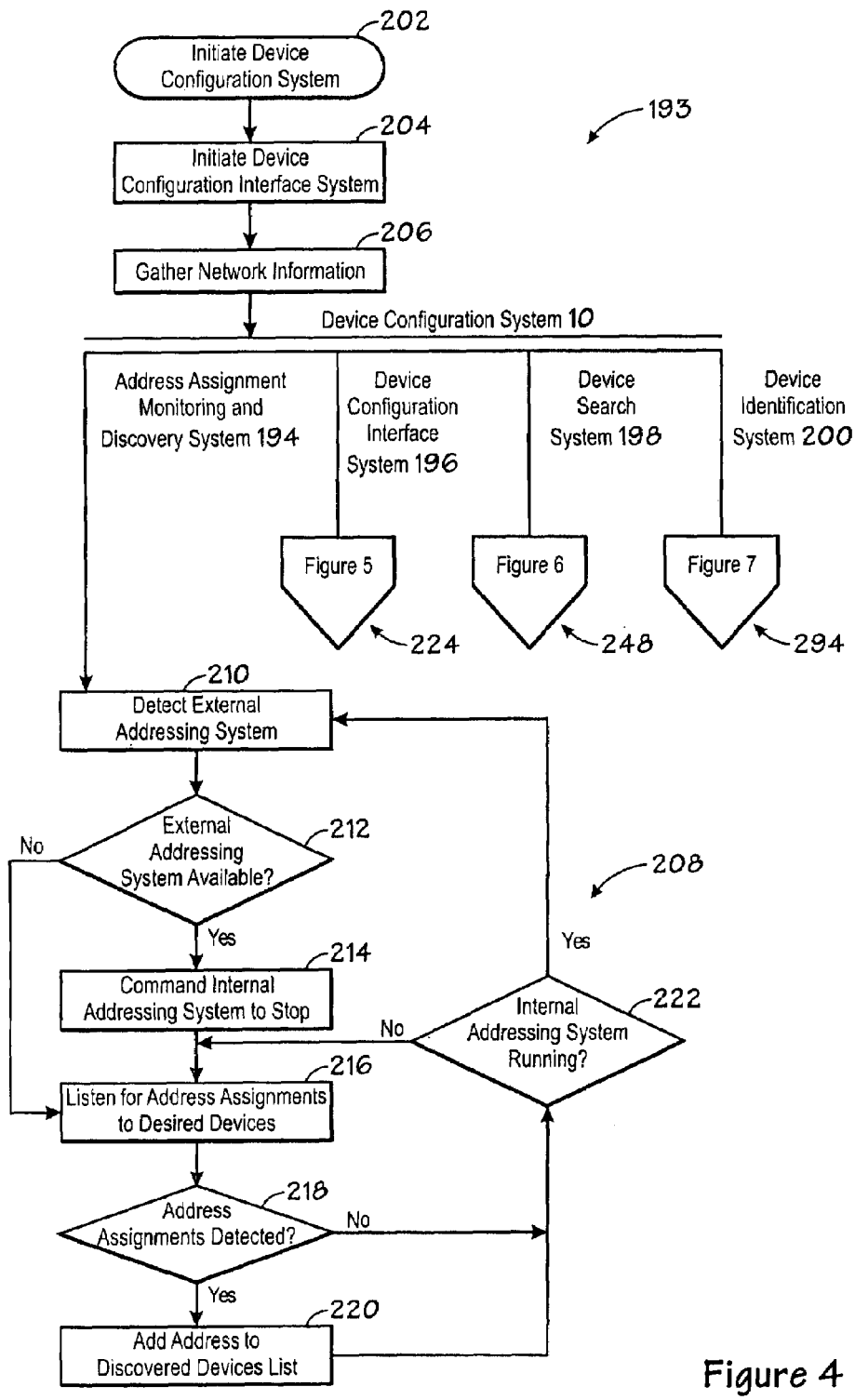
FIG. 4 illustrates an exemplary flow chart of the device configuration system having an address assignment monitoring and discovery system.

With reference to the assemblies and networks of FIGS. 1–3, an exemplary device configuration process 193 for the device configuration system 10 is illustrated in FIGS. 4–8. As discussed above, the device configuration system 10 may include execution and utilization of the device configuration assembly 12 independently or with the computing device 14, utilization of an addressing assembly, and utilization of one or more remote device configuration assemblies. The device configuration assembly 12, and the other assemblies illustrated in FIGS. 1–3, may include a variety of hardware and software to facilitate the execution of the processes illustrated in FIGS. 4–8. As illustrated in FIG. 4, the device configuration system 10 may include a plurality of systems, such as an address assignment monitoring a discover system 194, a device configuration interface system 196, a device search system 198, and a device identification system 200. These systems 194–200 may be simultaneously executed (e.g., multi-tasking) by the device configuration system 10 to facilitate efficient identification and configuration of the desired devices.

In operation, the user may initiate the device configuration system (block 202) by accessing the device configuration assembly 12 via the computing device 14. As discussed above, the device configuration assembly 12 may include a device configuration program having an interface, such as the interface 132 illustrated in FIG. 3. Accordingly, the device configuration process 193 also may include initiating the device configuration interface system (block 204). As the device configuration system 10 is initiated (block 202), the device configuration assembly 12 may detect and gather a variety of network information (block 206) to facilitate the discovery and identification of desired devices on the network. For example, as illustrated in FIG. 3, the device configuration assembly 12 may gather an IP address, a Subnet mask, a gateway address, a DHCP server, a search start range, and a search end range for each of the detected communication interfaces on the computing device 14. The device configuration process 193 also may utilize the device configuration assembly 12 to detect and gather various other network information (block 206) corresponding to computing devices in the local and remote networks. As discussed above, the device configuration process 193 may utilize a variety of systems in the device configuration 10, which may be independently and simultaneously operated to identify and configure the desired devices.

The address assignment monitoring and discovery system 194 may be executed to monitor and discover address assignments by an external addressing assembly, such as a DHCP server. Accordingly, the address assignment monitoring discovery system 194 may include an address assignment monitoring a discovery process 208, which includes detecting an external addressing system (block 210). If an external addressing system is available (block 212), then the address assignment monitoring and discovery process 208 commands an internal addressing system to stop (block 214) and proceeds to listen for address assignments to the desired devices (block 216). However, if an external addressing system is not available (block 212), then the address assignment monitoring and discovery process 208 proceeds to listen for address assignments to desired devices (block 216). If an address assignment is detected (block 218), then the device configuration assembly 12 adds the detected address assignment for the desired device to a discovered devices list (block 220), which may be the list 134 of interface 132. However, if no address assignments are detected (block 218), then the address assignment monitoring and discovery process 208 may proceed to determine if the internal addressing system is currently running (block 222). This is to ensure that the internal addressing system of the device configuration system 10 is not simultaneously running in potential conflict with the external addressing system. If the internal addressing system is not running (block 222), then the process 208 continues to listen for address assignments to desired devices (block 216). Accordingly, the address assignment monitoring and discovery process 208 continues to monitor for address assignments by the external addressing system as long as the device configuration system 10 continues to operate and the internal addressing system is not running. Thus, the address assignment monitoring and discovery system 194 of the device configuration system 10 provides a technique for discovering and identifying desired devices in a local or remote network coupled to the computing device 14.

Figure 5:
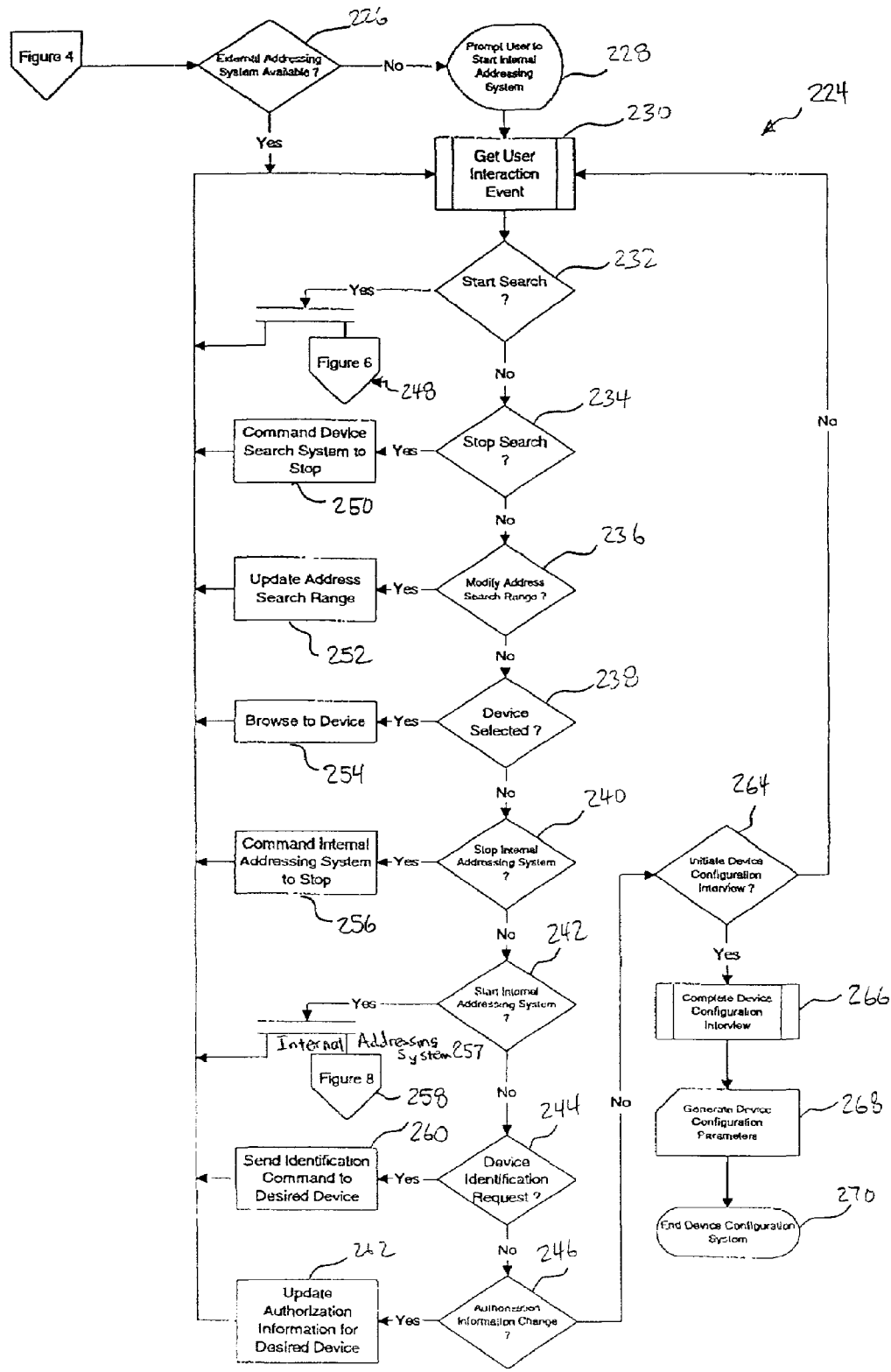
FIG. 5 illustrates an exemplary flow chart of a device configuration interface system for the device configuration system.

The device configuration system 10 also has a device configuration interface process 224 being executed by the device configuration interface system 196, as illustrated in FIG. 5. The device configuration interface system 196, which may include the user interface 132 illustrated in FIG. 3, is provided to facilitate user interaction during the device configuration process 193. As illustrated in FIG. 5, the device configuration interface process 224 may begin by determining the type of addressing system available by the device configuration system 10. If an external addressing system is not available (block 226), then the device configuration interface process prompts the user to start the internal addressing system (block 228). Once the internal addressing system is initiated by the device configuration system 10, then the device configuration interface process 224 proceeds to obtain a user interaction event (block 230). However, if an external addressing system is available (block 226), then the device configuration interface process 224 does not prompt for an internal addressing system, but rather it proceeds directly to obtaining a user interaction event (block 230). The user interaction event may be a keyboard entry, a mouse click, a video input, an audio input, or a variety of other local or remote events initiated by the user or by the desired computing device.

For example, the device configuration interface process 224 may await a user command to start a search for the desired device (block 232), to stop the search for the desired device (block 234), to modify an address search range (block 236), to select a device in the discovered devices list (block 238), to stop the internal addressing system (block 240), to start the internal addressing system (block 242), to make a device identification request (block 244), or to specify an authorization for information change (block 246). The device configuration interface process 224 continues to monitor, or request, specific input by the user to initiate any one of these events (blocks 232–246) until the device configuration process 193 is either complete or halted by the user. Accordingly, the user may select any one of these events to initiate the desired action by the device configuration interface system 196.

Figure 6:
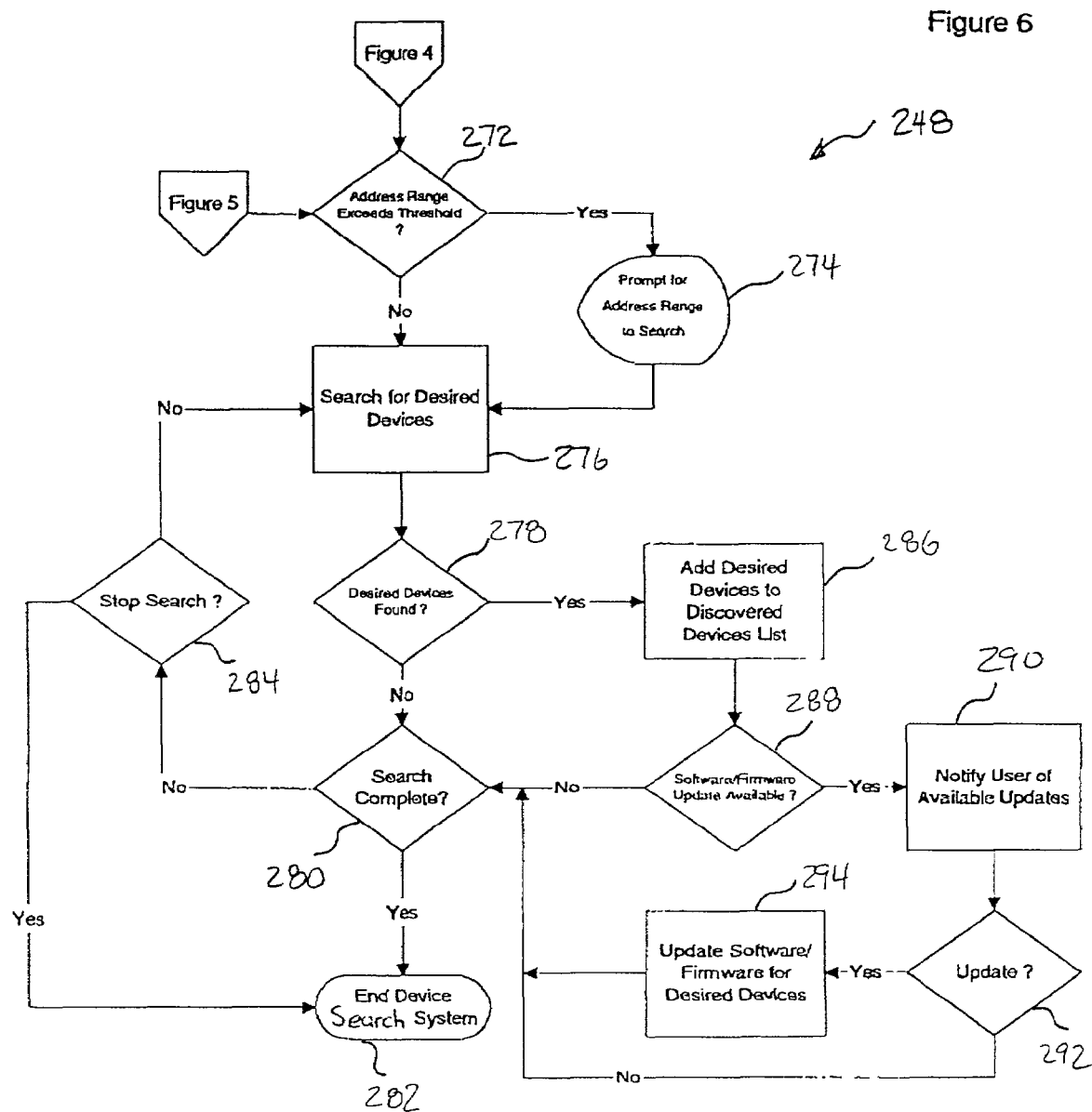
FIG. 6 illustrates an exemplary flow chart of a device search system for the device configuration system.

If the user chooses to start a search for desired devices (block 232), then the device configuration interface process 224 initiates or interacts with a device search process 248 of the device search system 198, as illustrated in FIG. 6. If the user chooses to stop the search for the desired devices (block 234), then the device configuration interface process 224 commands the device search system to stop (block 250). The user also may desire a modified search range for the device search system 198. Accordingly, the user may choose to modify the address search range (block 236), thereby updating the address search range (block 252) for the device search system 198. By modifying the address search range (block 236), the user may initiate an automatic execution of the device search process 248 or the user may be required to press a start button, such as the start button 170 illustrated in FIG. 3. If the device search system 198 detects one or more devices on the network, then the user may choose to select one of the desired devices on the discovered devices list. If one of the discovered devices is selected by the user (block 238), then the device configuration interface process 224 may initiate device configuration of the desired device. For example, the user may be directed to a device configuration interface, such as a web based device configuration system. Thus, the user may browse to the device (block 254) to configure the desired device automatically or via an interactive device configuration process. This device configuration process may be initiated by transmitting a remote network address to the desired device, which then initiates an automatic or interactive device configuration process via the remote device configuration assembly (e.g., assemblies 92 and 94).

Figure 8:
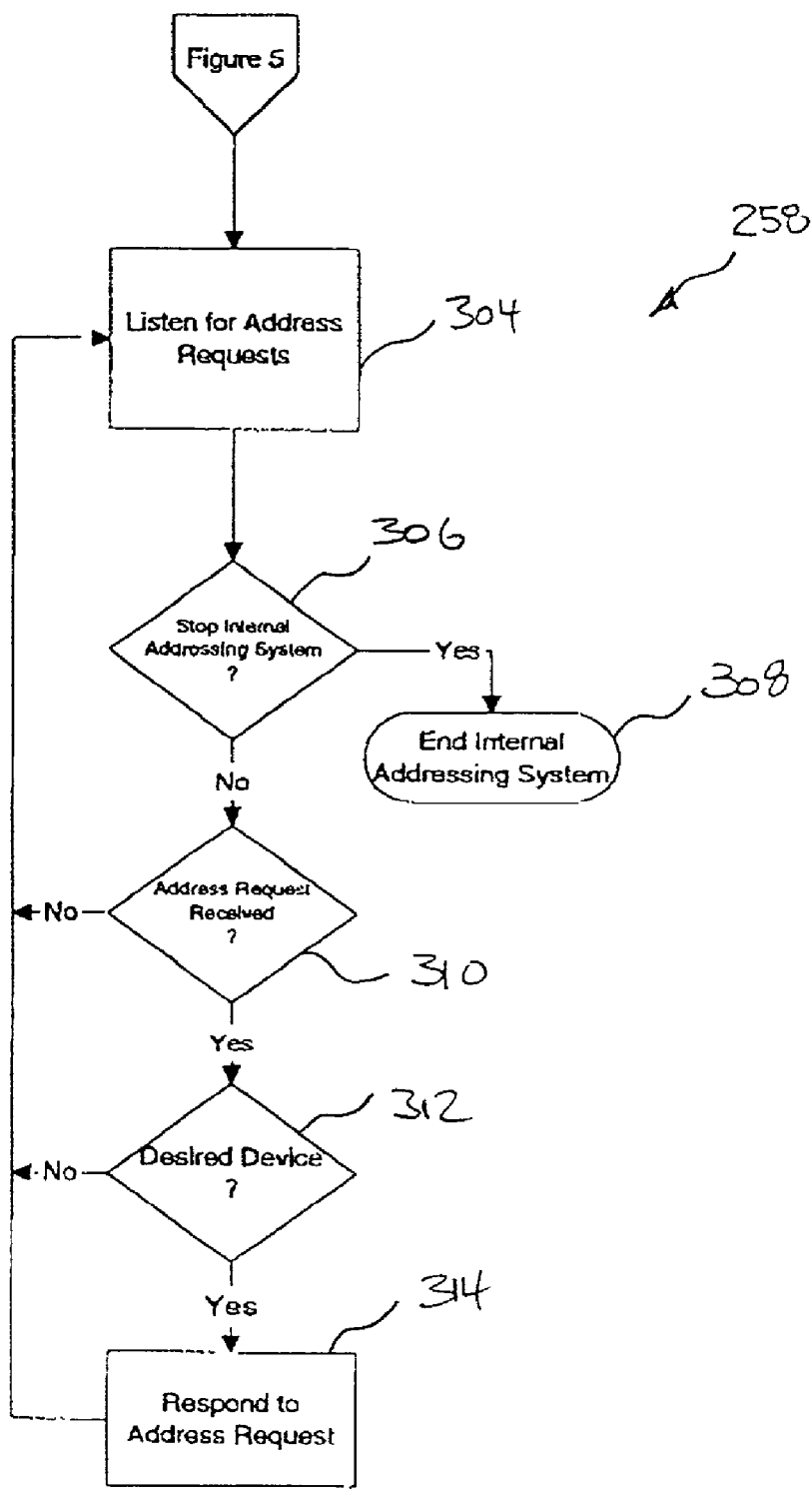
FIG. 8 illustrates an exemplary flow chart of a internal addressing system for the device configuration system.

The user also may initiate or stop an internal addressing system, which may be utilized by the device configuration system 10 where there is no local addressing system to complete the device configuration process 193. Accordingly, the user may choose to stop the internal addressing system (block 240), whereby the device configuration interface process 224 proceeds to command the internal addressing system to stop (block 256). However, if the user chooses to start the internal addressing system (block 242), then the device configuration interface process 224 proceeds to execute the internal addressing process 258 of the internal addressing system, as illustrated in FIG. 8.

The device configuration interface process 224 also may include a process for physically identifying a desired device on the network. For example, as discussed above, the device configuration interface process 224 may initiate an identification signal to be transmitted between the desired device and the device configuration assembly 12. This signal may trigger a light or some other identification event on one or both of the device configuration assembly 12 and the desired device. For example, the indicator 184 may be displayed on the user interface 132, as illustrated in FIG. 3. Accordingly, the user may request a device identification for the desired device (block 244), whereby the device configuration interface process 224 initiates the transmission of an identification command to the desired device (block 260). For example, the user may click on a desired device in the user interface 132 to initiate the transmission of an identification signal to the desired device, which then lights up an identification light on the device to allow the user to physically identify the desired device.

The device configuration interface process 224 also may facilitate security. For example, a security and authorization system may be provided for configuration of various computing devices on the network. The device configuration process 193 may restrict operation to specific manufacturers, to specific device classes, or other specific computing devices, as desired by the user or the supplier of the device configuration system 10. If the user chooses to authorize an information change (block 246), then the device configuration interface process 224 may initiate user input and update the authorization information for the desired device (block 262). For example, this authorization information may comprise a variety of security information for the desired devices, internal information for authorized users of the devices, and other information desired by the user or the supplier.

The user also has the option of manual configuration of the desired devices. As illustrated in FIG. 5, the user may initiate a device configuration interview (block 264), which may correspond to clicking the forward button 186 of the interface 132. Accordingly, if the device configuration process 193 does not detect, discover, or otherwise identify the desired devices, then the user may proceed with the device configuration interview (block 264). If the user initiates the device configuration interview (block 264), then the user interacts with the device configuration interface system 196 (e.g. the user interface 132) to complete the device configuration interview (block 266) and to generate device configuration parameters (block 268) for manually configuring the desired devices. For example, the device configuration parameters may be disposed on a floppy disk, a CD-ROM disk, or the configuration parameters may be transmitted to the desired device via the network or email. Once the user has completed the device configuration interview (block 264) or the device configuration process 193, then the device configuration interface process 224 may command the device configuration system 10 to stop (block 270).

FIG. 6 illustrates the device search process 248 of the device search system 198. As illustrated, the device search process 248 may be initiated by the device configuration system 10 or by the user via the device configuration interface system 196. Moreover, the device search process 248 may be initiated automatically by either of the systems 10 and 196. The device search process 248 can use a variety of pre-set search parameters and network parameters to facilitate the search for the desired devices on the network. For example, the device search process 248 may utilize a pre-set address search range to ensure a relatively rapid search for the desired devices. For example, the device search process 248 may have a pre-set address search range threshold, such as a 22 bit subnet range. Accordingly, the device search process 248 may compare the actual address search range with the address search range threshold. If the address range desired for the search exceeds the address range threshold (block 272), then the device search process 248 may prompt the user for a modified address search range to focus the search and efficiently search for the desired devices (block 274). Otherwise, if the address search range does not exceed the threshold, then the device search process 248 may proceed to search for desired devices on the network (block 276).

The device search process 248 may utilize a variety of identification criteria for locating the desired devices on the network. For example, as discussed above, the device search process 248 may scan for devices having a particular TCP/IP port, a particular MAC address, a particular firmware or software disposed on the computing device, or various other identification criteria for locating the desired devices. Accordingly, the device search process 248 may locate one or more desired devices having an identification criteria, such as a desired port. If desired devices are not found (block 278) by the device search process 248, then the device search process 248 may query the user as to whether the device search is complete (block 280). If the device search is complete (block 280), then the device search process 248 may proceed to end the device search system (block 282). However, if the device search is not complete (block 280), then the user may be provided an opportunity to stop the search (block 284). If the user chooses to stop the search (block 284), then the device search process 248 commands the device search system 198 to stop (block 282). Otherwise, the device search process 248 proceeds to search for desired devices (block 276) according to the criteria of the device search process 248.

If desired devices are found (block 278), then the device search process 248 proceeds to add the desired devices to the discovered devices list (block 286), such as the list 134 of the interface 132. The device search process 248 may then proceed to determine if software or firmware updates are available for the desired device (block 288). For example, the device search process 248 may compare the existing software or firmware with a database of current software/firmware for the desired device. The database may be disposed on the computing device 14 or on one of the remote device configuration assemblies 92 and 94, as illustrated in FIG. 2. If the device search process 248 discovers firmware or software updates for the desired device (block 288), then the device search process 248 may proceed to notify the user of the available updates (block 290) via an interface, such as the user interface 132. The user also may be provided with an opportunity to update the firmware or software with the available update (block 292). If the user chooses to update the firmware or software (block 292), then the device search process 248 may proceed to update the software/firmware for the desired devices (block 294). Otherwise, the device search process 248 proceeds to determine if the device search is complete (block 280). If a software or firmware update is available and is selected for updating, then the device search process 248 proceeds to determine if the device search is complete after updating the desired software/firmware. The device search process 248 continues until either the device search is complete (block 280) or until the user chooses to stop the search (block 284). The device configuration process 193 also may override the device search process 248.

Figure 7:
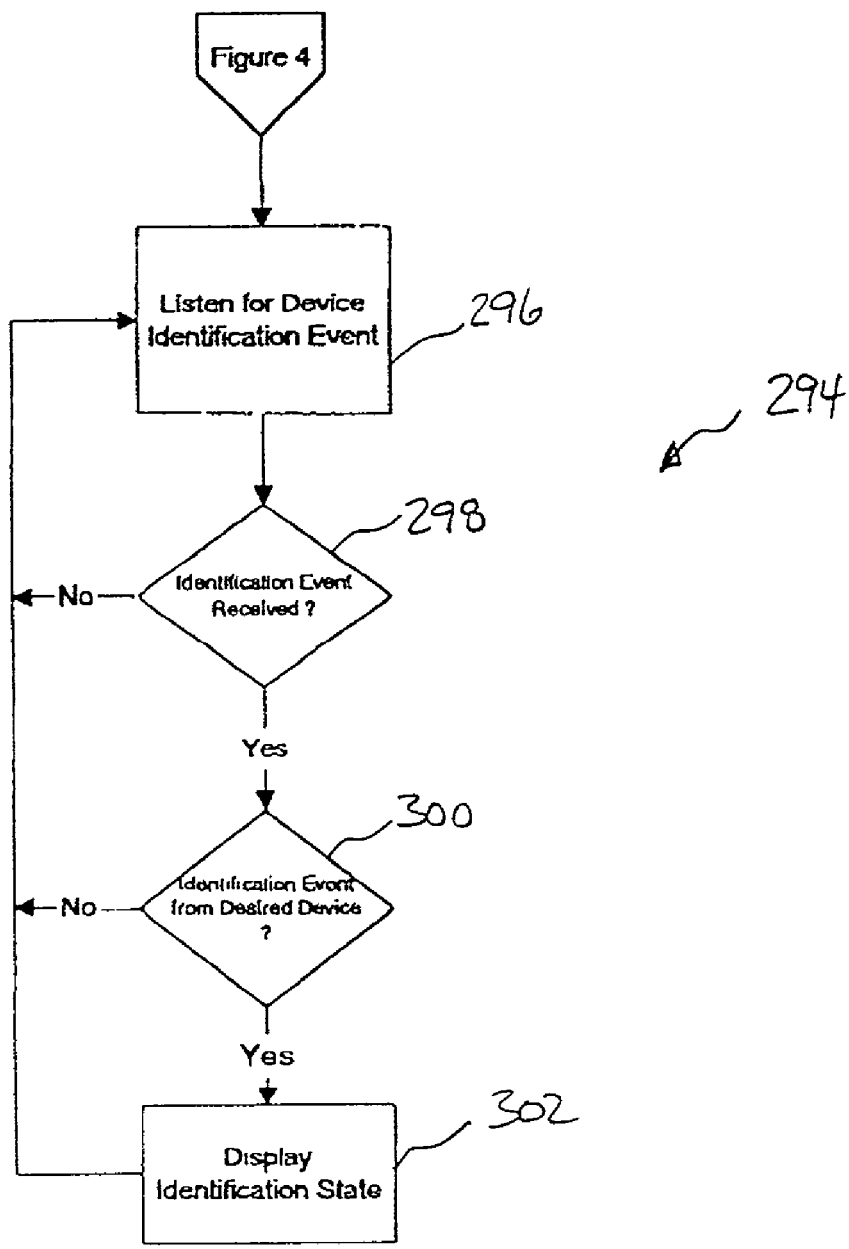
FIG. 7 illustrates an exemplary flow chart of a device identification system for the device configuration system.

FIG. 7 is an exemplary device identification process 294 of the device identification system 200. As discussed above, the desired device may be identified physically by communicating an identification signal between the desired device and the device configuration assembly 12. For example, the user may depress a button on the desired device to transmit an identification signal to the device configuration assembly 12, which may then display the identifier 184 via the user interface 132, as illustrated in FIG. 3. Alternatively, the user may click on one of the discovered devices in the list 134 of the user interface 132 to transmit an identification signal to the desired device. Accordingly, the device identification process 294 may include a routine for listening for a device identification event (block 296). If an identification event is not received (block 298), then the device identification process 294 continues to listen for device identification events (block 296). However, if the device identification process 294 receives an identification event (block 298), then the device identification process 294 precedes to determine if the identification event has been received from the desired device (block 300). If the identification event has not been received from the desired device, then the device identification process 294 continues to listen for device identification events (block 296). If the identification event is from the desired device (block 300), then the device identification process 294 proceeds to display an identification state (block 302), such as the identifier 184 illustrated in FIG. 3. Accordingly, the device identification process 294 facilitates physically identification of the desired device within a network or within the discovery devices list.

FIG. 8 is a exemplary internal addressing process 258 of the internal addressing system 257. As discussed above, the internal addressing process 258 is utilized by the device configuration process 193 when there is no external addressing system available in the network being searched for the desired devices. Accordingly, if the address assignment monitoring and discovery process 208 determines that there is an external addressing system available (block 212), then the internal addressing system 257 is commanded to stop (block 214). However, if there is no existing external addressing system, then the internal addressing process 258 operates to facilitate identification and configuration of the desired devices.

As illustrated, the internal addressing process 258 listens for address requests (block 304) from devices coupled to the network. The internal addressing process 258 also may continue to monitor for stop commands from the user or the device configuration process 193. If the internal addressing processing 258 receives a stop command (block 306), then the internal addressing process 258 commands the internal addressing system 257 to stop (block 308). Otherwise, the internal addressing processing 258 continues to listen for address requests (block 304) until an address request is received (block 310). If an address request is received (block 310) by the internal addressing system 257, then the internal addressing process 258 analyzes the address request to determine if the request is associated with one of the desired devices (block 312). If the address request is not from one of the desired devices (block 312), then the internal addressing process 258 continues to listen for address requests (block 304). If the address request was received from one of the desired devices (block 312), such as a device identified by a desired port, a desired MAC address, a desired software application or other identification criteria, then the internal addressing process 258 proceeds to respond to the address request (block 314). Thus, the internal addressing process 258 functions as an address management system for devices coupled to the network, but only for those devices desired by the user or the supplier of the device configuration system 10.

Altogether, the device configuration process 193 of the device configuration system 10 operates to discover or otherwise locate desired devices on one or more networks and to identify particular criteria of the desired devices to facilitate configuration of the desired devices. For example, the present technique may facilitate configuration of network parameters, software installation and maintenance, software/firmware updates, product service and maintenance and various other functions for the desired device. In operation, the present technique may use a variety of existing and custom hardware and software, a variety of independent and integrated software routines and servers, and various other components necessary to identify and configure the desired devices in a relatively integrated device configuration system 10.

While the invention may be susceptible to various modifications and alternative forms, specific embodiments have been shown by way of example in the drawings and have been described in detail herein. However, it should be understood that the invention is not intended to be limited to the particular forms disclosed. For example, the present technique may be applied to a variety of computer systems, servers, workstations and computing devices communicating through a network. The present technique also may be utilized in a variety of operating environments and system platforms. Accordingly, the invention is intended to cover all modifications, equivalents, and alternatives falling within the spirit and scope of the invention as defined by the following appended claims.

What is claimed is:

1. A method for configuring a computing device coupled to a network, comprising the acts of:
actively electronically discovering a computing device coupled to a network;
identifying the computing device, wherein identifying the computing device comprises initiating a sensory identification event to identify the computing device; and
configuring network parameters of the computing device based on the identification.

2. The method of claim 1, wherein the act of actively electronically discovering the computing device comprises the act of monitoring network conmiunications.

3. The method of claim 2, wherein the act of monitoring network communications comprises the act of discovering an address assignment for the computing device.

4. The method of claim 2, wherein the act of monitoring network communications comprises the act of detecting an address request from the computing device.

5. The method of claim 4, wherein the act of actively electronically discovering the computing device comprises the act of responding to the address request.

6. The method of claim 5, wherein the act of responding to the address request comprises the acts of verifying a desired characteristic of the computing device and assigning a network address to the computing device.

7. The method of claim 1, wherein the act of actively electronically discovering the computing device comprises the act of scanning an address range of the network.

8. The method of claim 7, wherein the act of scanning the address range comprises the act of searching for devices having a desired identifier.

9. The method of claim 1, wherein the act of identifying the computing device comprises the act of discovering a desired device characteristic.

10. The method of claim 9, wherein the act of discovering the desired device characteristic comprises the act of discovering a device category.

11. The method of claim 10, wherein the act of discovering the device category comprises the act of discovering a device source.

12. The method of claim 11, wherein the act of discovering the device source comprises the act of discovering a device manufacturer.

13. The method of claim 12, wherein the act of discovering the desired device characteristic comprises the act of discovering a device model.

14. The method of claim 1, wherein the act of initiating a sensory identification event comprises the act of communicating an identification signal from the computing device to a remote display via the network.

15. The method of claim 1, wherein the act of initiating a sensory identification event comprises the act of communicating an identification signal from a remote interface to the computing device via the network.

16. The method of claim 1, wherein the act of configuring network parameters of the computing device comprises the act of remotely and automatically configuring the computing device using desired network parameters based on the identification of the computing device.

17. The method of claim 1, wherein the act of configuring network parameters of the computing device comprises the act of remotely interacting with computing device.

18. The method of claim 17, wherein the act of remotely interacting with the computing device comprises the act of configuring network addresses for the computing device.

19. The method of claim 17, wherein the act of remotely interacting with the computing device comprises the act of initiating a remote configuration system for the computing device.

20. The method of claim 19, wherein the act of initiating the remote configuration system comprises the act of transmitting a network address to the computing device based on the identification.

21. The method of claim 20, wherein the act of transmitting the network address comprises the act of electronically directing the computing device to a web-based device configuration system.

22. The method of claim 1, comprising the act of interacting with the computing device via a remote computing device.

23. The method of claim 22, comprising the act of managing network addressing via the device configuration program.

24. The method of claim 22, comprising the act of accessing a device configuration program via the remote computing device.

25. The method of claim 24, comprising the act of displaying a list of devices electronically discovered.

26. The method of claim 25, comprising the act of selecting a desired device and transmitting configuration information to the desired device via the network.

27. The method of claim 1, comprising remotely configuring a plurality of the computing devices that have been electronically located and identified.

28. An actively discovered network server configured by the method of claim 1.

29. The method of claim 1, wherein the computing device is headless.

30. The method of claim 1, wherein the act of initiating a sensory identification event comprises enabling user interaction with the computing device to activate a unit identification indicator in a graphical user interface of a remote display.

31. The method of claim 30, wherein enabling user interaction with the computing device comprises providing a button on the computing device.

32. The method of claim 1, wherein the act of initiating a sensory identification event comprises permitting selection of the computing device via a graphical user interface to trigger sensory output from the computing device.

33. The method of claim 32, wherein the sensory output comprises light emission from the computing device.

34. A method for networking a desired device, comprising the acts of:
electronically searching to identify the presence and location of a desired device on a network;
triggering a sensory identification event to identify the desired device; and
remotely configuring operational parameters of the desired device via the network.

35. The method of claim 34, wherein the act of electronically searching to identify the presence and location of the desired device comprises the act of electronically discovering a network address for the desired device.

36. The method of claim 34, wherein the act of electronically searching to identify the presence and location of the desired device comprises the act of analyzing an address request communication from the desired device.

37. The method of claim 36, wherein the act of electronically searching to identify the presence and location of the desired device comprises the act of generating a response to the address request communication based on address control parameters.

38. The method of claim 37, wherein the act of generating the response comprises the acts of:
verifying an authorization criteria for configuring the desired device; and
assigning a network address to the desired device having the authorization criteria verified.

39. The method of claim 34, wherein the act of electronically searching to identify the presence and location of the desired device comprises the act of electronically searching the network for a desired identifier for the desired device.

40. The method of claim 34, wherein the act of electronically searching to identify the presence and location of the desired device comprises the act of discovering a desired device identifier.

41. The method of claim 40, wherein the act of discovering the desired device identifier comprises the act of discovering a product identifier for the desired device.

42. The method of claim 34, wherein the act of remotely configuring operational parameters of the desired device comprises the act of configuring a network address for the desired device.

43. The method of claim 34, wherein the act of remotely configuring operational parameters of the desired device comprises the act of initiating a remote configuration system having a device database adapted to facilitate configuration of the desired device.

44. The method of claim 43, wherein the act of initiating the remote configuration system comprises the act of transmitting a network address to the desired device to facilitate communication with the remote configuration system.

45. The method of claim 34, wherein the act of remotely configuring operational parameters of the desired device comprises the act of electronically communicating with the desired device via a remote computing system.

46. The method of claim 45, comprising the act of executing a device configuration program via the remote computing system.

47. The method of claim 34, wherein the act of triggering the sensory identification event comprises the act of transmitting an identification signal between the desired device and a remote interface via the network.

48. The method of claim 34, wherein the desired device is headless.

49. The method of claim 34, wherein the act of triggering a sensory identification event comprises enabling user interaction with the desired device to activate a unit identification indicator in a graphical user interface of a remote display.

50. The method of claim 34, wherein the act of triggering a sensory identification event comprises permitting selection of the desired device via a graphical user interface to activate a light of the desired device.

51. A system of configuring a second computing device via a first computing device, wherein the first and second computing devices are communicatively coupled via a network, the system comprising:
a device configuration assembly accessible by the first computing device, comprising:
a device discovery assembly adapted for actively discovering the second computing device on the network and further adapted to facilitate identification of the second device via a sensory identification event; and
a device setup assembly adapted for initiating configuration of the second computing device via the network.

52. The system of claim 51, wherein the first computing device comprises a display and an input device.

53. The system of claim 51, wherein the second computing device comprises a network device.

54. The system of claim 53, wherein the network device comprises a cache server.

55. The system of claim 53, wherein the network device comprises a file server.

56. The system of claim 53, wherein the network device comprises an application server.

57. The system of claim 53, wherein the network device comprises a web server.

58. The system of claim 51, wherein the network comprises the Internet.

59. The system of claim 51, wherein the device configuration assembly is disposed on the first computing device.

60. The system of claim 51, wherein the device discovery assembly comprises a network addressing assembly.

61. The system of claim 60, wherein the network addressing assembly comprises a network address management server coupled to the network.

62. The system of claim 60, wherein the network addressing assembly comprises a network addressing module adapted for internally managing network addresses of devices coupled to the network.

63. The system of claim 60, wherein the network addressing assembly comprises a dynamic address assignment module.

64. The system of claim 51, wherein the device configuration assembly comprises a user interface.

65. The system of claim 51, wherein the device discovery assembly comprises an address request monitor adapted to discover an address request from the second computing device.

66. The system of claim 65, wherein the device discovery assembly comprises an address assignment module adapted to assign a network address to the second computing device in response to the address request.

67. The system of claim 51, wherein the device discovery assembly comprises an address assignment monitor adapted to discover an address assignment to the second computing device.

68. The system of claim 51, wherein the device discovery assembly comprises a device identification module adapted to discover device information of the second computing device and to identify the second computing device based on the device information.

69. The system of claim 51, wherein the device discovery assembly comprises a device locator module adapted for communicating an identification signal between the device locator module and an identification assembly coupled to the second computing device.

70. The system of claim 69, wherein the identification assembly comprises a physical triggering mechanism configured to activate a unit identification indicator in a graphical user interface.

71. The system of claim 70, wherein physical triggering mechanism comprises a button.

72. The system of claim 69, wherein the identification assembly comprises a sensory output mechanism configured to emit sensory output upon selection of the second computing device via a graphical user interface.

73. The system of claim 72, wherein the sensory output mechanism comprises a light.

74. The system of claim 51, wherein the device discovery assembly comprises a device search module adapted to search the network for the second computing device based on desired parameters.

75. The system of claim 70, wherein the desired parameters comprise a desired network address range.

76. The system of claim 51, wherein the device setup assembly comprises a device configuration module adapted to configure operational parameters of the second computing device.

77. The system of claim 76, where the device configuration module comprises a remote configuration module coupled to the network, the remote configuration module comprising device specifications.

78. The system of claim 51, wherein the device discovery assembly comprises means for discovering the second computing device.

79. The system of claim 51, wherein the device setup assembly comprises means for configuring the second computing device.

80. The system of claim 51, wherein the second device is headless.

81. A system for remotely configuring a networked computing device, comprising:
a network analysis module adapted to determine a network address of a desired device coupled to a network;
a device identification module adapted to search for and identify the presence of the desired device based on desired parameters and to facilitate identification of the desired device via a sensory identification event; and
a device configuration module adapted to configure the desired device via the network.

82. The system of claim 81, wherein the desired device comprises a network appliance.

83. The system of claim 81, wherein the desired device comprises a web server.

84. The system of claim 81, wherein the network comprises the Internet.

85. The system of claim 81, wherein the network analysis module comprises a network analysis program disposed on a memory device and accessible by a computing device coupled to the network.

86. The system of claim 81, wherein the network analysis module comprises a network communication monitor adapted to detect a network transmission associated with the desired device.

87. The system of claim 81, wherein the network analysis module comprises an address assignment monitor adapted to detect an address assignment associated with the desired device.

88. The system of claim 81, wherein the network analysis module comprises a network scanner module adapted to search an address range of the network for the desired device.

89. The system of claim 81, wherein the device identification module comprises a device type identifier module adapted to discover a desired type of the desired device based on the desired parameters.

90. The system of claim 81, wherein the device identification module comprises a device locator module adapted to identify the desired device via an identifier signal communicated between the desired device and the device locator module.

91. The system of claim 81, comprising a network address assignment module adapted to assign the network address to the desired device.

92. The system of claim 81, comprising a network address management server having the network analysis module.

93. The system of claim 81, wherein the device configuration module comprises a network configuration module adapted to configure network parameters for the desired device.

94. The system of claim 81, where the network configuration module comprises a communication module adapted to initiate remote configuration of desired device.

95. The system of claim 81, wherein the desired device is headless.

96. The system of claim 81, wherein the device identification module comprises a device locator module adapted to activate a unit identification indicator of a graphical user interface upon receipt of an identification signal from the desired device.

97. The system of claim 81, wherein the device identification module comprises a device locator module adapted to trigger a sensory output event from the desired device upon selection of the desired device from a graphical user interface.

* * * * *

UNITED STATES PATENT AND TRADEMARK OFFICE
CERTIFICATE OF CORRECTION

PATENT NO. : 7,240,106 B2  Page 1 of 1
APPLICATION NO. : 09/842572
DATED : July 3, 2007
INVENTOR(S) : Charles W. Cochran et al.

It is certified that error appears in the above-identified patent and that said Letters Patent is hereby corrected as shown below:

In column 17, line 61, in Claim 2, delete "conmiunications" and insert -- communications --, therefor.

In column 21, line 51, in Claim 75, delete "claim 70" and insert -- claim 74 --, therefor.

Signed and Sealed this

First Day of September, 2009

David J. Kappos
*Director of the United States Patent and Trademark Office*